United States Patent [19]

Ochiai

[11] Patent Number: 5,692,685
[45] Date of Patent: Dec. 2, 1997

[54] PROPOLIS FOOD PRODUCING METHOD AND PROPOLIS FOOD

[75] Inventor: Shoichi Ochiai, Yamanashi, Japan

[73] Assignee: Aquarian House Co., Ltd., Yamanashi, Japan

[21] Appl. No.: 586,342

[22] Filed: Jan. 16, 1996

[30] Foreign Application Priority Data

Sep. 25, 1995 [JP] Japan .................... 7-270458

[51] Int. Cl.$^6$ .................................... B02C 19/12
[52] U.S. Cl. ............................. 241/21; 241/29
[58] Field of Search ............. 241/21, 23, DIG. 37, 241/12, 29

[56] References Cited

U.S. PATENT DOCUMENTS

| 1,807,383 | 5/1931 | Carnahan | 241/21 |
| 3,960,329 | 6/1976 | Aagaard | 241/DIG. 37 X |
| 4,060,203 | 11/1977 | Edwards et al. | 241/12 X |
| 4,504,516 | 3/1985 | Schanze . | |
| 4,540,594 | 9/1985 | Schanze . | |

*Primary Examiner*—Mark Rosenbaum
*Attorney, Agent, or Firm*—Bachman & LaPointe, P.C.

[57] ABSTRACT

A propolis piece is comminuted into fine grains or further into colloid to produce a propolis food which is easy to eat. The comminution is achieved using one of a rolling ball mill, a vibrating mill, a tower mill, a medium agitating mill, a roller mill, a high-speed tumbling mill, a jet mill, a planetary mill and an attrition mill.

4 Claims, 4 Drawing Sheets

100 mm 9 mm

PROPOLIS FOOD PRODUCING METHOD AND PROPOLIS FOOD

BACKGROUND OF THE INVENTION

1. Field of the Invention

The present invention relates to a method for processing propolis, as a material, to achieve a propolis food and a propolis food made by the method.

2. Description of the Prior Art

The propolis is produced by honeybees and known as an antibacterial material or a health promotion material. However, the picked-up or gathered propolis is too hard to eat as it is. Thus, on a practical basis, the propolis, as a raw material, is processed to produce a propolis food composition, which is taken by, for example, adding to other drinks or foods, as disclosed in Japanese Second (examined) Patent Publication No. 4-66544.

This propolis food composition is produced in the following manner:

First, glycerol, water and tetraglycerol=monooleate are mixed and agitated to obtain a mixed liquid. Then, a propolis piece is put into the mixed liquid for agitation so as to obtain a primitive liquid mixture which contains therein a solution of propolis components soluble with the mixed liquid and the propolis residue insoluble therewith. By filtering the primitive liquid mixture through a 200 mesh metal screen to exclude the propolis residue, the foregoing propolis food composition is obtained.

However, since the primitive liquid mixture includes the solution of soluble propolis components and the insoluble propolis residue, it is necessary to remove the propolis residue from the primitive liquid mixture for deriving the propolis food composition so that a large quantity of the propolis residue has to be abandoned. This deteriorates the production efficiency of the propolis food composition and further results in abandoning advantageous components of the propolis included in the propolis residue.

SUMMARY OF THE INVENTION

Therefore, it is an object of the present invention to provide an improved process for producing a propolis food from the propolis.

It is another object of the present invention to provide a propolis food produced by the improved process.

According to one aspect of the present invention, a process for producing a propolis food comprises the steps of providing propolis; and comminuting the propolis into fine grains by physical comminuting means.

According to another aspect of the present invention, a process for producing a propolis food comprises the steps of providing propolis; and comminuting the propolis into colloid by physical comminuting means.

It may be arranged that the physical comminuting means is one of a rolling ball mill, a vibrating mill, a tower mill, a medium agitating mill, a roller mill, a high-speed tumbling mill, a jet mill, a planetary mill and an attrition mill.

According to another aspect of the present invention, a propolis food product is made by one of the foregoing processes.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described hereinbelow with reference to the accompanying drawings.

Figure 1:
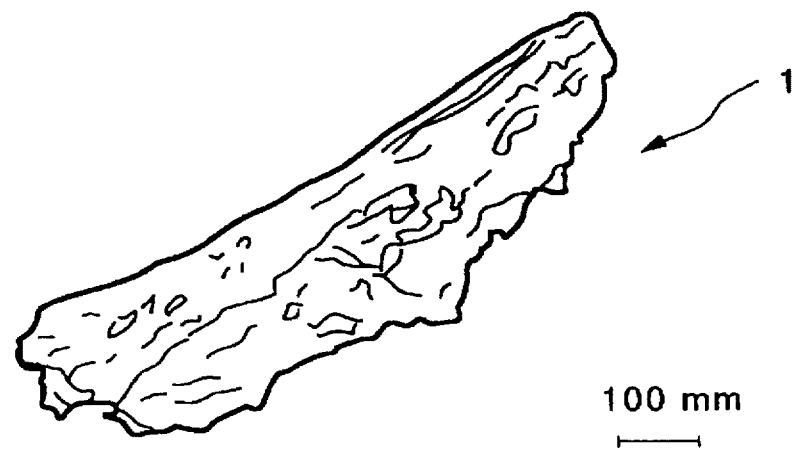
FIG. 1 is a diagram showing a propolis piece used in a preferred embodiment of the present invention.

Propolis which is taken from the honeycomb has been available In various countries, such as Brazil, U.S.A., the People's Republic of Chine, Western Europe and Eastern Europe. In this preferred embodiment, a propolis piece 1 available in Brazil as shown in FIG. 1 is used. The propolis piece 1 is known as an antibacterial material or a health promotion material, which, however, is too hard to each as it is. In view of this, in this preferred embodiment, the propolis piece 1 is comminuted or milled into fine grains or further into colloid so as to provide a propolis food which is easy to eat.

Figure 2:
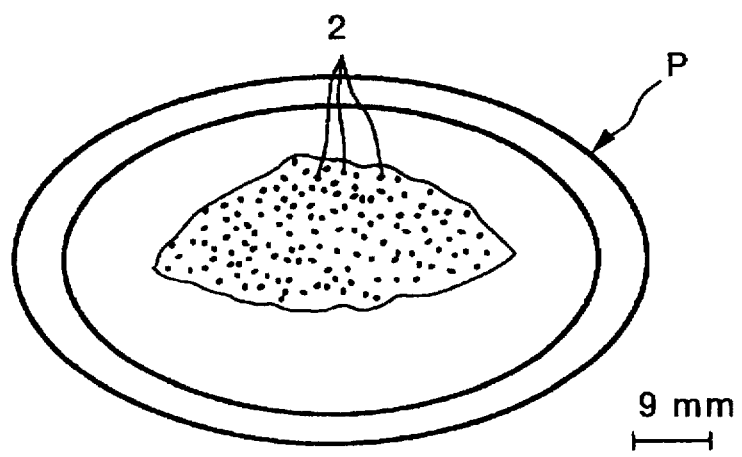
FIG. 2 is a diagram showing propolis grains obtained in a graining process according to the preferred embodiment.

The propolis food is produced in the following manner:

First, as shown in FIG. 2, the propolis piece 1 is broken into propolis grains 2 (grain size: 2 mm~3 mm) during a graining process. In FIG. 2, alphabet P denotes a plate. Subsequently, the propolis grains 2 are comminuted into fine grains or particles, and further comminuted into colloid in a fine-graining process.

As physical comminuting means used in the fine-graining process, a planetary mill, an attrition mill, a rolling ball mill, a vibrating mill, a tower mill, a medium agitating mill, a roller mill, a high-speed tumbling mill, a jet mill or the like may be used.

Figure 3:
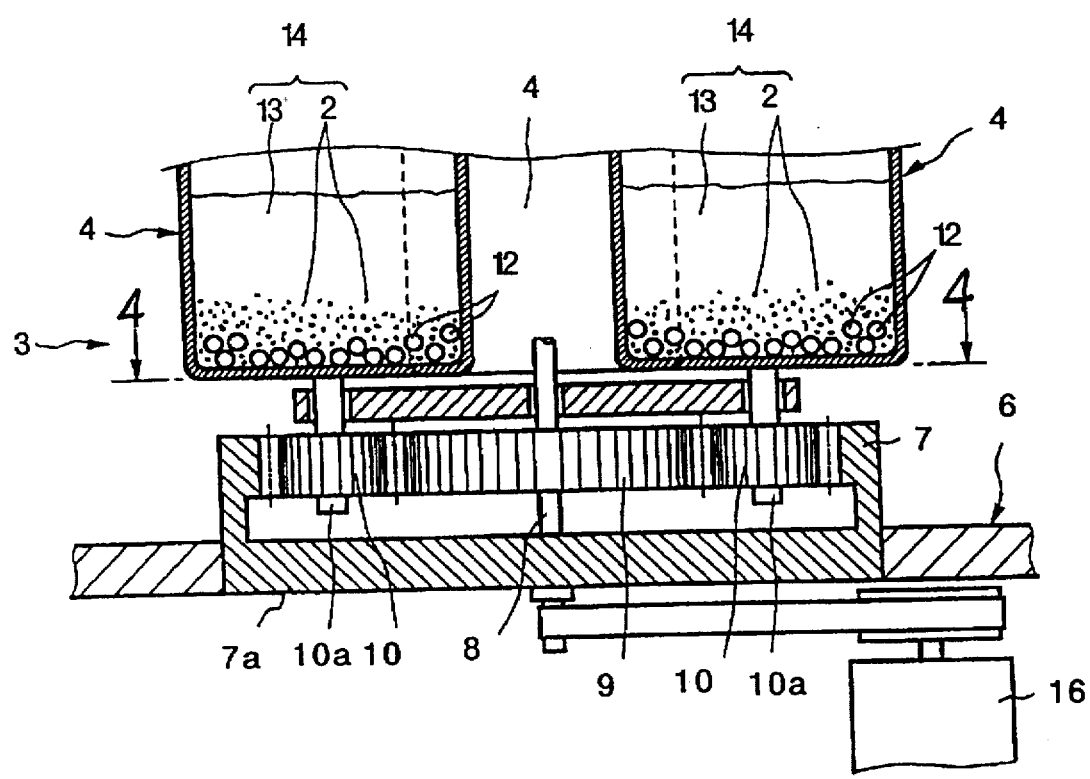
FIG. 3 is a sectional view showing a planetary mill used in the preferred embodiment.

In this preferred embodiment, a planetary mill 3 is used as shown in FIG. 3.

Figure 4:
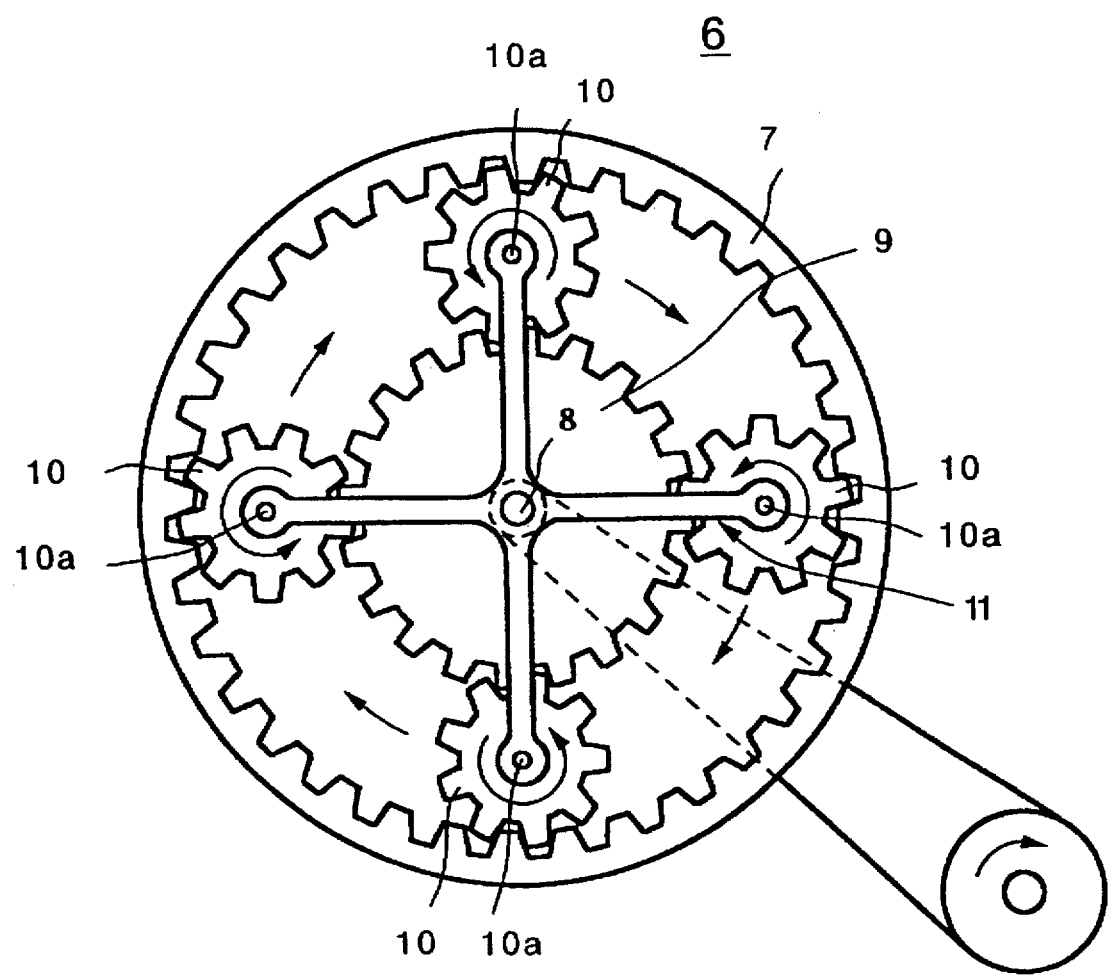
FIG. 4 is a diagram seen in a direction 4—4 in FIG. 3.

In FIG. 3, the planetary mill 3 includes, as also shown in FIG. 4, an internal gear 7, in the form of a cylindrical container, fixed to a mill body 6 and having teeth along the inner peripheral edge thereof, a sun gear 9 fixed to a drive shaft 8 which is vertically and rotatably provided at the center of the internal gear 7, and four planetary gears 10 provided between the sun gear 9 and the internal gear 7. Each planetary gear 10 has a rotation shaft 10a which is rotatably supported by the drive shaft 8 via a cross-shaped arm 11. Further, a container 4 with a lid, as accommodating means, is detachably fixed onto the rotation shaft 10a of each of the planetary gears 10. In this preferred embodiment, each container 4 is formed of agate, while it may be formed of another material which is harder than the propolis grains 2, for example, stainless steel.

The drive shaft 8 is connected to a motor 16 at the underside of a bottom 7a of the internal gear 7. When the sun gear 9 starts to rotate following rotation of the motor 16, each of the container 4 is caused to rotate via the corresponding rotation shaft 10a of the planetary gear 10 and is further caused to revolve about the sun gear 9. Thus, the centrifugal force is applied within the containers 4 so that the propolis grains 2 within the containers 4 are, due to collision with the containers 4 harder than the propolis grains 2 and with balls 12 formed of the same material as the containers 4, comminuted into fine grains or particles with a grain size of no greater than 3 μm. By continuing comminution, the fine-grained propolis is formed into colloid so that a colloidal solution 14 of the propolis is obtained. In FIG. 3, numeral 13 denotes water.

In this specification, "colloid" represents a matter having a particle size of 1 nm~1 m ("Chemical Large Dictionary" issued by Kabushiki Kaisha Tokyo Kagaku Dojin, Oct. 20, 1989).

When the propolis grains 2 are milled by the physical comminuting means, such as the planetary mill 3 as described above, the following advantages can be achieved:

As opposed to the foregoing conventional technique, in this preferred embodiment, the solvent producing process for obtaining the mixed liquid by mixing and agitating glycerol, water and tetraglycerol=monooleate, the dissolving process for adding a propolis piece into the mixed liquid to obtain the primitive liquid mixture which contains therein the solution of propolis components soluble with the mixed liquid and the propolis residue insoluble therewith, and the filtering process for filtering the primitive liquid mixture through the metal screen to exclude the propolis residue, are not necessary so that the production process can be simplified.

Further, in this preferred embodiment, the propolis grains 2 are directly milled into fine grains or further into colloid for subsequent use, the propolis residue is not caused so that the components in the propolis can be used effectively.

On the other hand, if the propolis grains 2 are comminuted without putting the water 13 into the containers 4, a wax component is melted out from the propolis grains 2 to adhere to the balls 12. In this case, it has been confirmed through experiments that a milling time for the propolis grains 2 are required extremely longer. As opposed to this, in this preferred embodiment, since the water 13 is added to the propolis grains 2 and the balls 12, the adhesion of the propolis grains 2 to the balls 12 are effectively prevented due to the presence of the water 13 so that a milling time can be shortened.

Further, even when a friction heat is generated due to friction between the propolis grains 2 and the balls 12, since temperatures within the containers can be held around an ordinary temperature due to the presence of the water 13, no cooling means is necessary. This further prevents destruction of advantageous components, such as vitamin, which are weak against the heat.

EXAMPLE

The propolis grains 2 were milled into fine grains and further into colloid using the planetary mill 3.

Figure 5:
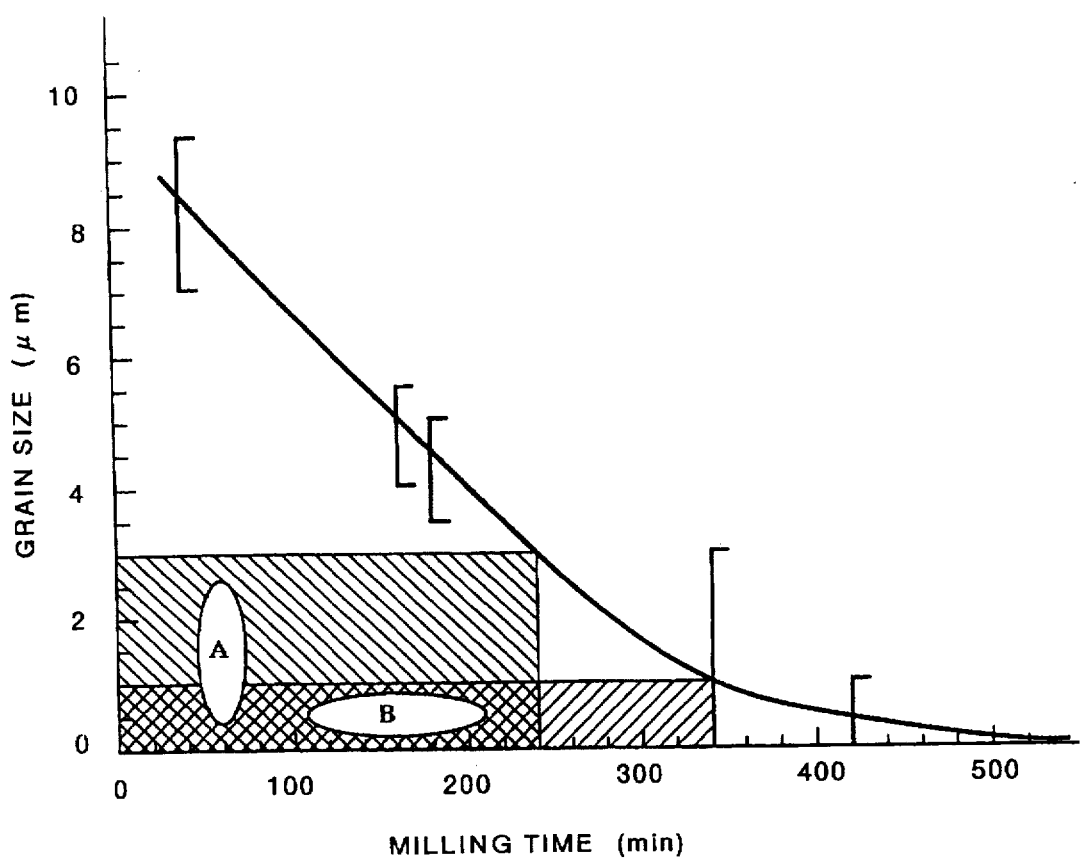
FIG. 5 is a diagram showing a relationship between a milling time and a propolis grain size according to the preferred embodiment.

Specifically, 20 g of the propolis grains 2 and the agate walls 12, each having a diameter of 10 mm, as many as 100 were put into each of the agate containers 4. Then, 100 g of the water 13 was added into each container 4, and the planetary mill 3 was started in operation. FIG. 5 shows results of the experiment where the propolis grains 2 were comminuted by the planetary mill 3, that is, a relationship between a milling time achieved by the planetary mill 3 and a grain or particle size of the milled propolis grains 2. In FIG. 5, alphabet A represents a fine-grain region, while alphabet B represents a colloid region. As seen from FIG. 5, upon a lapse of a milling time of 240 minutes, a grain size of the propolis grain 2 became 3.0 μm, that is, the propolis grains 2 were milled into fine grains. This grain size corresponds to, for example, a coffee grain size (2 μm~3 μm) floating in coffee to drink. Further, after a lapse of a milling time of 340 minutes, a grain size of the propolis grain 2 became no greater than 1.0 μm so as to be in the colloidal state. Moreover, after a lapse of a milling time of 500 minutes, a grain size of the propolis grain 2 became no greater than 0.1 μm, which represented the colloid having a large number of propolis particles and thus a large active interface.

The colloidal state of the propolis has the following advantages:

From the colloidal solution 14 in which the propolis milled into colloid is floating, fine propolis powder can be achieved by freeze-dry lyophilization. Since the propolis powder thus obtained is separated from the water 13, it is suitable for long-term preservation.

When eating the propolis powder, the propolis powder is, for example, dissolved into drinking water, such as juice. In this case, since the propolis powder, that is, the propolis food, has a characteristic of colloid, it can be stably diffused into drinking water. Accordingly, solidification or precipitation of the propolis powder in drinking water is prevented so as to facilitate drinking. Further, since the colloidal propolis powder can be stably diffused into water as described above, handling of the propolis powder is facilitated when adding it into the ingredients of such as jelly or konjak jelly. Moreover, the colloidal propolis food is highly improved in absorption efficiency into the human body as compared with non-colloidal one.

The colloidal food having the foregoing large active interface is further improved in the foregoing advantages.

In the foregoing preferred embodiment, the propolis food is produced through the two process steps, that is, the graining process and the fine-graining process. On the other hand, the propolis piece 1 may be directly milled into colloid using the planetary mill.

In the foregoing preferred embodiment, the planetary mill 3 is used. However, instead of it, another ball mill, such as a rolling ball mill, a vibrating mill or a tower mill may be used, or further, a medium agitating mill, a roller mill, a high-speed tumbling mill, a jet mill, an attrition mill, or the like may be used.

Even the propolis food with grain size of 2 μm~3 μm can be handled like drinking water such as coffee. Further, the colloidal solution 14 may be drunk as it is without performing freeze-dry lyophilization to achieve the propolis powder.

Further, instead of the water 13, another liquid, such as alcohol, glycerol or liquid nitrogen may be used.

When using liquid nitrogen, the propolis powder can be obtained by vaporizing liquid nitrogen at an ordinary temperature.

In the foregoing preferred embodiment, the relatively expensive and brittle agate containers 14 and balls 12 are used. Instead of them, less-expensive and less-brittle stainless steel containers and balls may be used for achieving reduction in cost for producing the propolis food.

In the foregoing preferred embodiment, the water 13 is used in the fine-graining process. On the other hand, by freezing the propolis grains 2 and keeping a temperature of the planetary mill 3 at a given low level, melting-out of the wax component from the propolis grains 2 can be prevented.

While the present invention has been described in terms of the preferred embodiments, the invention is not to be limited thereto, but can be embodied in various ways without departing from the principle of the invention as defined in the appended claims.

What is claimed is:

1. A process for producing a propolis food comprising the steps of:

providing at least one propolis piece;

milling said at least one propolis piece into grains;

adding water to said grains of propolis to form a mixture of said grains of propolis and the water; and further milling said mixture to form a colloid.

2. A process according to claim 1 wherein said grains have a grain size of less than or equal to 3 mm.

3. A process for producing a propolis food comprising the steps of:

providing grains of propolis;

adding water to said grains of propolis to form a mixture of said grains of propolis and water; and milling said mixture to form a colloid.

4. A process according to claim 3 wherein said grains have a grain size of less than or equal to 3 mm.

* * * * *